United States Patent
Mondri et al.

(10) Patent No.: US 7,584,505 B2
(45) Date of Patent: Sep. 1, 2009

(54) INSPECTED SECURE COMMUNICATION PROTOCOL

(75) Inventors: Ron Mondri, Bellevue, WA (US); Sara Bitan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 11/172,643

(22) Filed: Jun. 30, 2005

(65) Prior Publication Data

US 2006/0005239 A1     Jan. 5, 2006

Related U.S. Application Data

(63) Continuation-in-part of application No. 09/981,203, filed on Feb. 21, 2001, now abandoned.

(51) Int. Cl.
G06F 17/00     (2006.01)
G06F 9/00      (2006.01)
H04L 9/00      (2006.01)

(52) U.S. Cl. ................ 726/13; 713/151; 713/156
(58) Field of Classification Search .......... 713/151, 713/156; 726/13
See application file for complete search history.

(56) References Cited

U.S. PATENT DOCUMENTS

| | | | |
|---|---|---|---|
| 6,094,485 A | 7/2000 | Weinstein et al. | |
| 6,367,009 B1 | 4/2002 | Davis et al. | |
| 6,732,269 B1 | 5/2004 | Baskey et al. | |
| 7,114,083 B2 * | 9/2006 | Devine et al. | 713/152 |
| 2002/0091921 A1 | 7/2002 | Kunzinger | |
| 2002/0099957 A1 | 7/2002 | Kramer et al. | |
| 2003/0014628 A1 | 1/2003 | Freed et al. | |
| 2004/0015725 A1 | 1/2004 | Boneh et al. | |

FOREIGN PATENT DOCUMENTS

WO    WO2004036360 A2    4/2004

OTHER PUBLICATIONS

"Encrypted Traffic Solutions", retrieved on Apr. 14, 2009 from Internet Archive WayBackMachine at <<http://web.archive.org/web/20050305234128/http://www.aladdin.com/eSafe/traffic_solutions.asp>>, Aladdin Knowledge Systems, Ltd., Mar. 5, 2005, 1 pg.
"Providing Top Level Security for Web Applications and Services", retrieved on Apr. 14, 2009 from Internet Archive WayBackMachine at <<http://web.archive.org/web/20050323020930/http://www.myfuturecom.com/products/f5/f5BigIPFIPS540.asp>>, Future Com, Ltd., Oct. 29, 2004, 4 pgs.

* cited by examiner

*Primary Examiner*—Kambiz Zand
*Assistant Examiner*—Aubrey H Wyszynski
(74) *Attorney, Agent, or Firm*—Lee & Hayes, PLLC

(57) ABSTRACT

A technique for establishing inspected secure communication includes establishing a first secure connection between a client device and a client-side device and a second secure connection between the client-side device and a server device. The client-side device establishes the first secure communication channel by providing a certificate impersonating the server device to the client device. The first and second communication channels enable client-side inspection of communications.

8 Claims, 10 Drawing Sheets

INSPECTED SECURE COMMUNICATION PROTOCOL

CROSS-REFERENCE TO RELATED APPLICATIONS

This is a continuation-in-part of application Ser. No. 09/681,203 filed Feb. 21, 2001.

BACKGROUND

The Secure Socket Layer (SSL) protocol is widely used to protect privacy and integrity of communications across networks. The SSL protocol creates a secure connection between a client and a server allowing data to be securely exchanged over the connection. The SSL protocol utilizes certificates to authenticate the remote server to the client, and optionally to authenticate the client to the server. The SSL protocol also utilizes symmetric key encryption and integrity protection to securely transfer data. Accordingly, the protocol enables identification of the remote side of the network conversation and prevents third parties from accessing the data being sent.

FIG. 1 shows an exemplary network 100 adaptable for communication using the SSL protocol. The exemplary network 100 includes a client device 110 communicatively coupled to a server device 115. The client device 110 may be a personal computer, a client computer, a hand-held or laptop device, a set top box, a programmable consumer electronic and/or the like. The server device 120 may be a personal computer, a host computer, a server computer, a hand-held or laptop device, a set top box, a mini-computer, a mainframe computer, a distributed computer system and/or the like.

The client device 110 and the server device 115 may be directly coupled to each other or indirectly coupled to each other through one or more networks 120, 125, 130. The networks 120, 125, 130 may include a plurality of communication channels 135, 140 and one or more other computing devices 145, 150. The networks 140 may include an intranet, an extranet, the Internet, a wide-area network (WAN), a local area network (LAN), and/or the like. The communication channels 130, 135 and networks 140 may implement any connectivity strategies, such as broadband connectivity, modem connectivity, digital subscriber link (DSL) connectivity, wireless connectivity or the like.

In one implementation, the client device 110 may be communicatively coupled to a client-side device 145 in a client-side network 120. The client-side device 145 may be a proxy server, firewall or other front-end type device. Although not shown, one or more additional client-side devices may also be communicatively coupled to the client-side device 145. The client-side network 120 may, for example, be a corporation's local area network. The server device 115 may be communicatively coupled by a server-side device 160 to one or more other networks 125, 120. The server-side device 150 may be a proxy server, firewall and/or other front-end type device. The server-side network 130 may also include one or more additional server-side devices (not shown).

The SSL protocol includes a handshake phase for establishing a socket connection and a session phase for securely sending data between the client and server devices 110, 115. Referring now to FIG. 2, a technique of establishing an SSL session in the exemplary network of FIG. 1 is shown. The handshake phase 200 includes exchanging commands to initiate the session, to determine the version of SSL implemented by the client device and the server device, to determine the cipher libraries supported by the devices, to determine the data compression methods supported by the devices, to specify a session identifier and to exchange random data for use in the generating session keys.

The handshake phase 200 further includes transmitting the certificate 210 of the server 115 to the client device 110. The client device 110 authenticates the identity that the certificate claims to represent. Among other things, authenticating the server 115 includes determining if the distinguished name of the issuer (Issuer's DN) specified in the server's certificate 210 corresponds to a certificate authority contained in a list of trusted certificate authorities 220 maintained on by the client device 110. It is also determined if the issuing certificate authority's public key validates the issuer's digital signature contained in the server's certificate 210. The client device 110 also verifies that the current date is within the validity period specified in the server's certificate 210. The client device 110 further determines that the DN specified in the server's certificate 210 matches the uniform resource locator that the client device is attempting to communicate with), when validating the identity of the server.

If the identity of the server device 115 is authenticated, the data generated in the handshake phase 200 so far is utilized by the client device 110 to generate a pre-master secret 230 for the session. The pre-master secret 230 is encrypted by the client device 110 utilizing the public key of the server that was contained in the authenticated server certificate 210. The client device 110 sends the encrypted pre-master secret 230, and if applicable the client's own certificate, to the server device 115.

The server device 115 uses its private key to decrypt the pre-master secret 230'. The client and server devices 110, 115 each generate a master secret 240, 240' from the pre-master secret 230, 230'. Both the client and server 110, 115 use the master secret 240, 240' to generate a session key 250, 250'. The session key 250, 250' is a symmetric key that is used to encrypt and decrypt data exchanged during the session phase. The symmetric key enables rapid encryption, decryption and tamper detection, as compared to public-private key encryption techniques.

Referring now to FIG. 3, a technique of exchanging data during an SSL session 300 in the exemplary network of FIG. 1 is shown. During the session phase 300, messages 310 generated by the client device 110 are hashed 315 to generate a message digest 320. The message digest 320 is appended to the message 310 and the combination 325 is encrypted 330 utilizing the session key. The resulting encrypted packet 335 is then transmitted across one or more communication channels 340 and one or more networks to the server device. The server device 115 decrypts 345 the received packets 335' utilizing the session key to recover the combined message 325'. The message portion of the combined message 325' is hashed 350 to generate an authenticator 355. The authenticator 355 is compared 360 to the message digest portion of the combined message 325'. If the authenticator 355 and the message digest are equivalent, the server device 115 knows that the message has been received from the client device 110 and that it has not been altered during transmission. An equivalent process is also utilized to send messages from the server device 115 to the client device 110.

Accordingly, the handshake phase 200 of the SSL protocol uses digital certificates to authenticate the server device 115 to the client device 110, and optionally to authenticate the client device 110 to the server device 115. The handshake phase 200 utilizes public-private key encryption to transfer a secret from the client device 110 to the server device 115, if the identify of the devices 110, 115 are authenticated. The client and server devices 110, 115 may then generate the session key from the secret. The session key is utilized during the session phase 300 to securely exchange data between the client and server devices 110, 115.

The SSL protocol provides for end-to-end secure communication. More specifically, the encrypted packets transmitted between the client and server devices 110, 115 are tunneled through any intermediary devices 120, 150 of the networks 120, 125, 130. The encrypted messages are routed by intermediary devices 120, 150 according to a header that contains little more then routing information. The intermediary devices 120, 150 are unable to inspect the encrypted data. Accordingly, the SSL protocol makes it difficult to determine if a client device 110 is receiving malicious content, such as worms, viruses and the like, from the server device 115. The SSL encryption also makes it difficult to determine if a client device 110 is sending confidential data to the server 115. For example, in a proxied environment, the client-side proxy 145 tunnels the encrypted client traffic (e.g., data) to the server 115 without the ability to read and understand the data. Thus, the client-side proxy 145 is unable to apply an entity's security policy to data transferred utilizing the SSL protocol.

SUMMARY

The techniques described herein are directed toward a secure communication protocol providing for client-side inspection of messages. The inspected secure communication begins with establishing a first secure connection between a client device and a client-side device and a second secure connection between the client-side device and a server device. The communication between the first secure connection and the second secure connection is inspected. Accordingly, a security policy may be enforced against the communication to determine if the client device is receiving malicious content, is receiving prohibited content, is sending confidential data and/or the like.

BRIEF DESCRIPTION OF THE DRAWINGS

Embodiments of the present invention are illustrated by way of example and not by way of limitation, in the figures of the accompanying drawings and in which like reference numerals refer to similar elements and in which:

FIGS. 10 and 11 show a flow diagram of a method of inspecting secure communications.

DETAILED DESCRIPTION OF THE INVENTION

Figure 1:
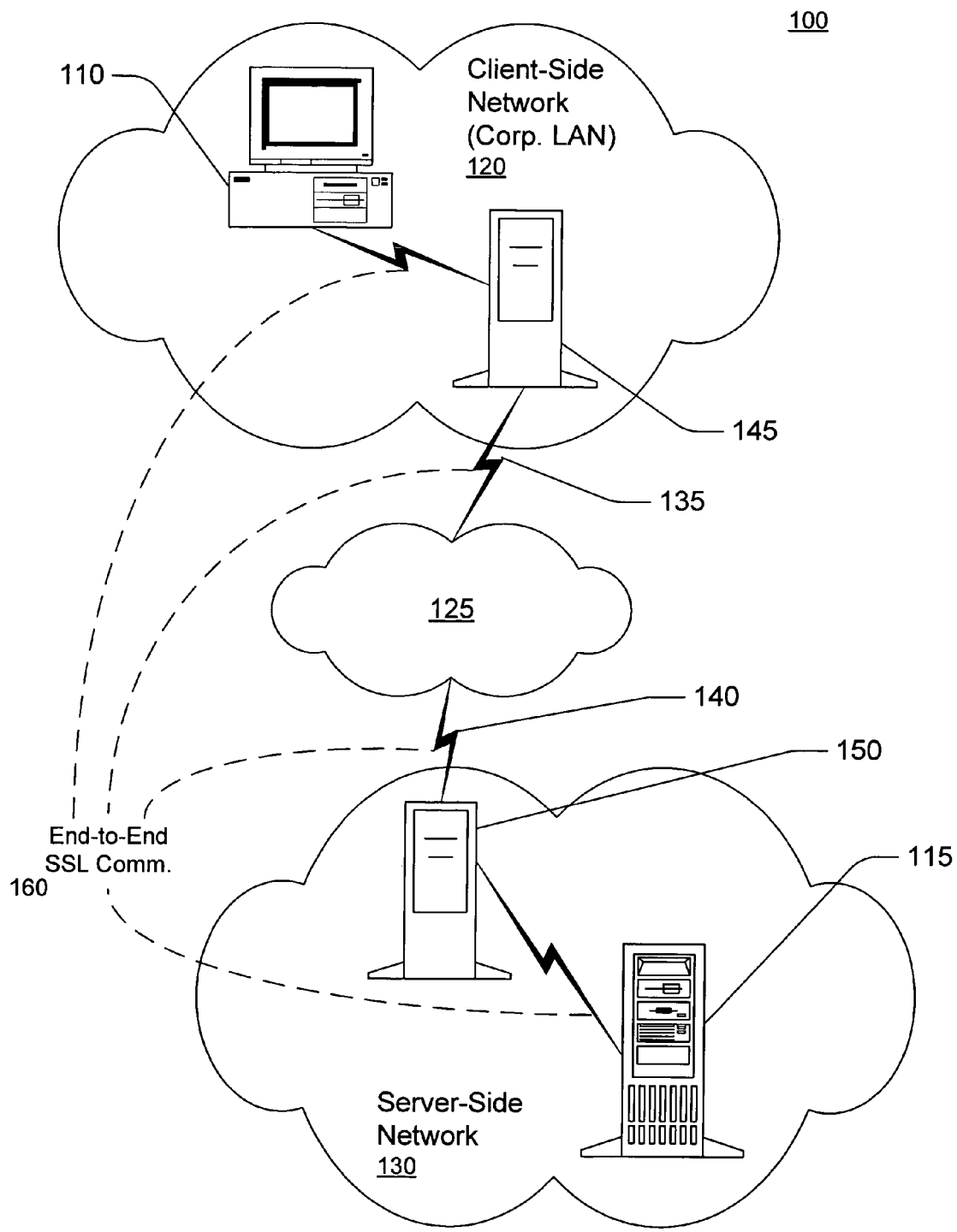
FIG. 1 shows a block diagram of an exemplary network adaptable for communication using the secure socket layer protocol.
Figure 2:
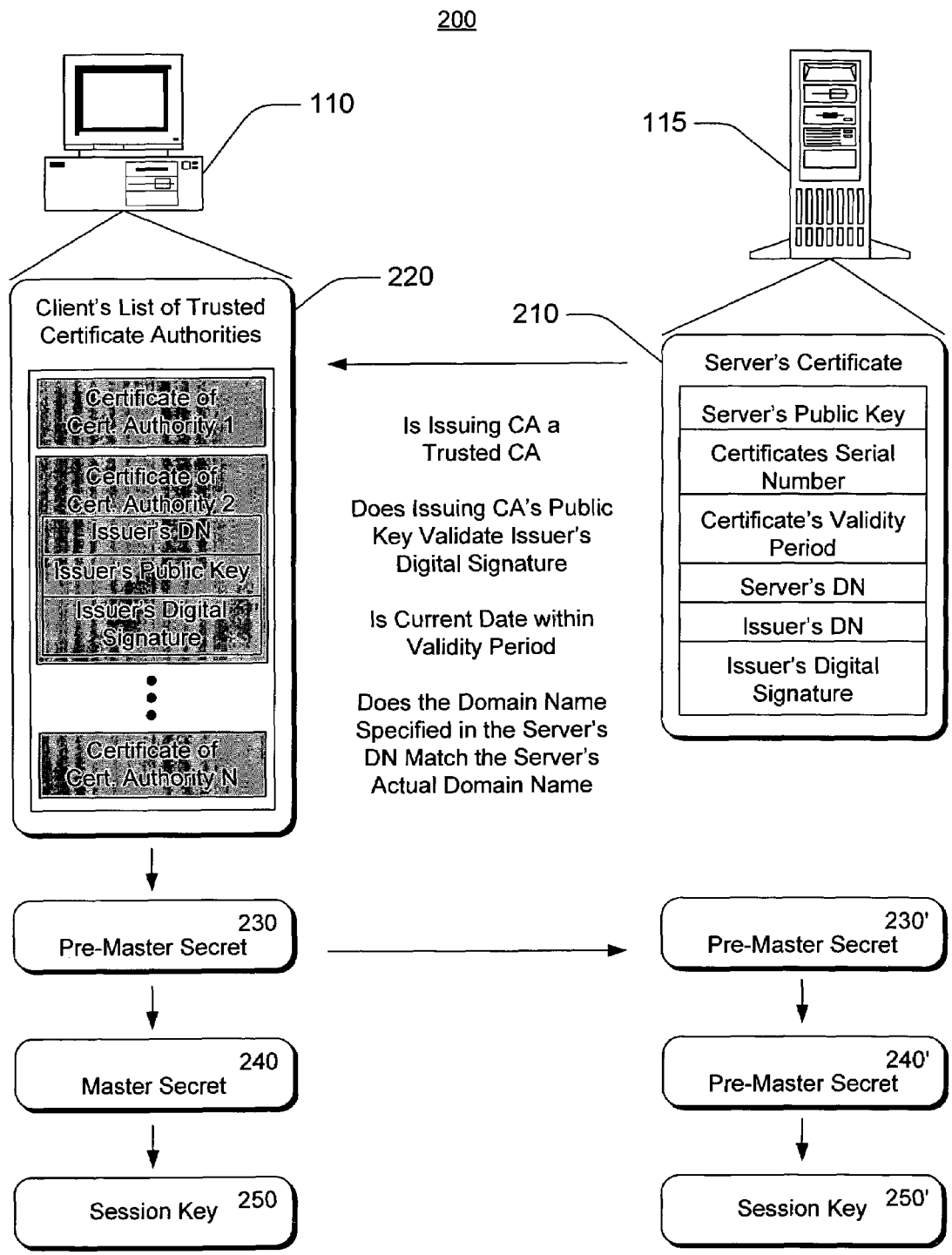
FIG. 2 shows a block diagram of a technique of establishing a secure socket layer session in an exemplary network.
Figure 3:
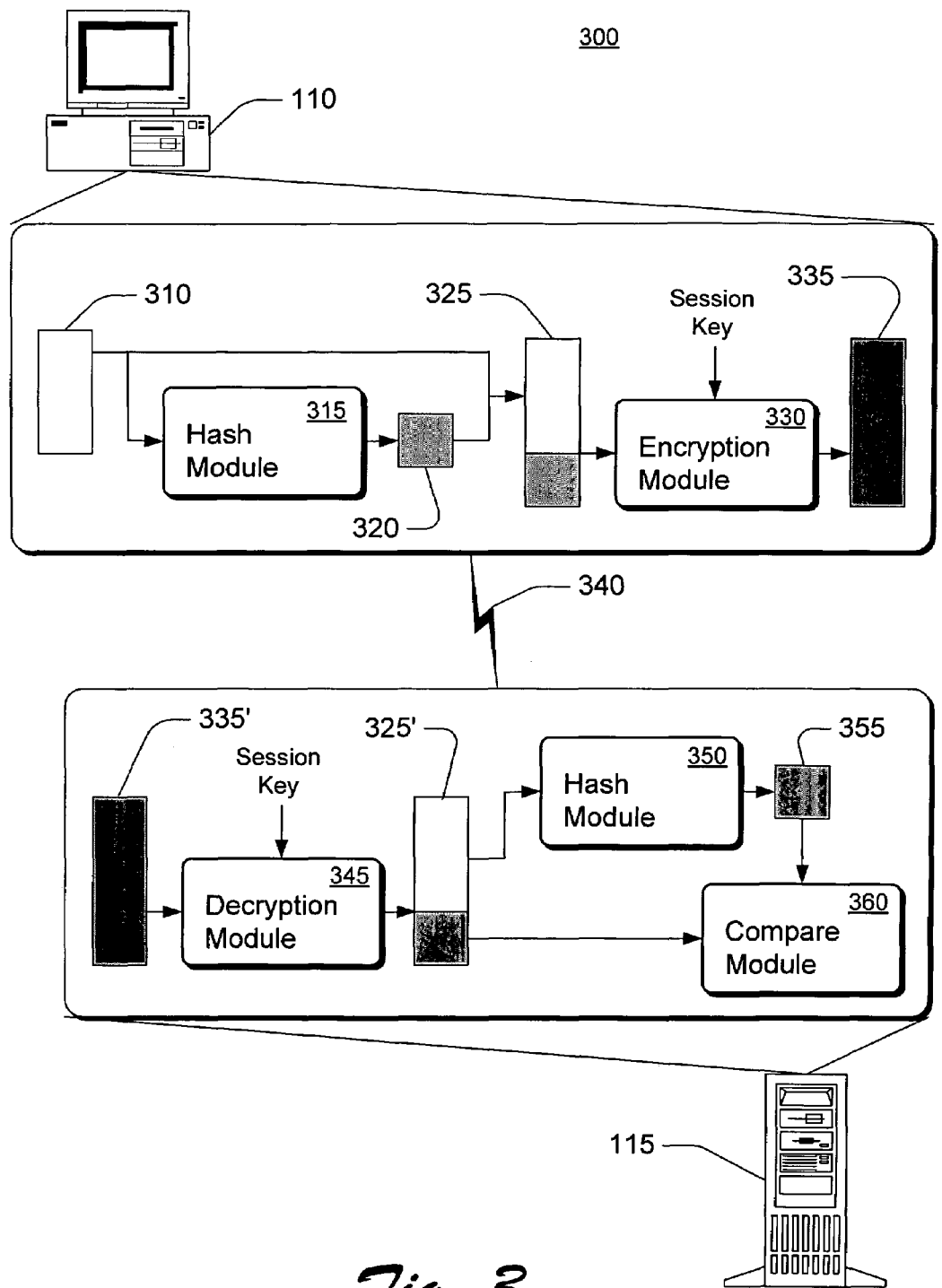
FIG. 3 shows a block diagram of a technique of exchanging data during a secure socket layer session in an exemplary network.
Figure 4:
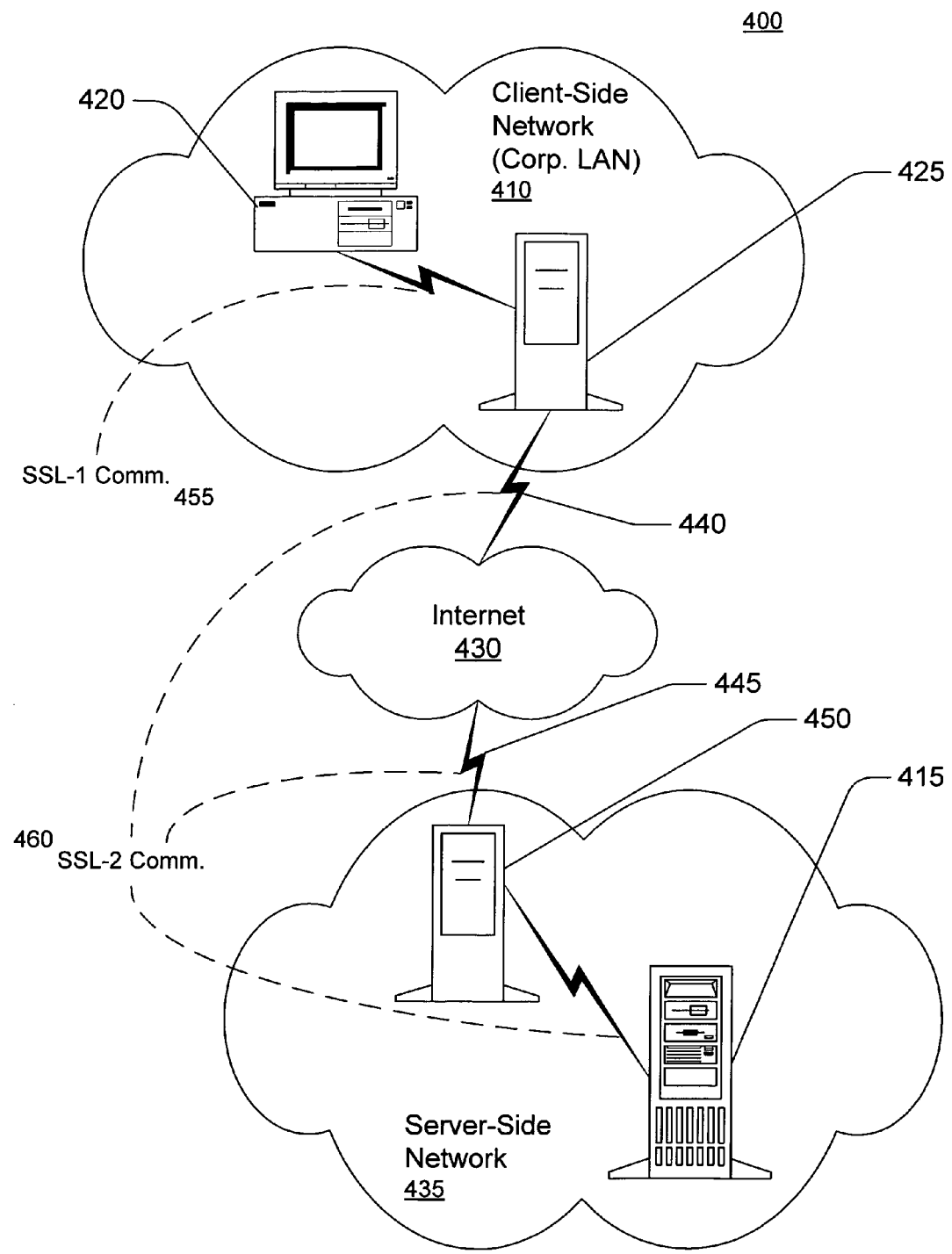
FIG. 4 shows a block diagram of a network adaptable for communications using an inspected secure socket layer protocol.

FIG. 4 shows a network 400 adaptable for communications using an inspected SSL protocol. The network 400 includes a client network 410 communicatively coupled to a server device 415. The client network 410 includes one or more client devices 420 and a client-side device 425. The client devices 420 may be personal computers, client computers, hand-held or laptop devices, set top boxes, programmable consumer electronics and/or the like. The server device 415 may be a personal computer, a host computer, a server computer, a hand-held or laptop device, a set top box, a minicomputer, a mainframe computer, a distributed computer system and/or the like. The client-side device 425 may be a proxy, firewall or other front-end type device.

The client network 410 and the server device 415 may be directly coupled to each other or indirectly coupled through one or more networks 430, 435. The networks 400, 410, 430, 435 may include a plurality of communication channels 440, 445 and one or more other computing devices. The networks 400, 410, 430, 435 may include an intranet, an extranet, the Internet, a wide-area network (WAN), a local area network (LAN), and/or the like. The communication channels 440, 445 and networks 400, 410, 430, 435 may implement any connectivity strategies, such as broadband connectivity, modem connectivity, digital subscriber link (DSL) connectivity, wireless connectivity or the like.

In one implementation, the server device 415 may be communicatively coupled to a server-side device 450 to form a server-side network 435. The server-side device may be a proxy server, firewall or other front-end type device. Although not shown, one or more additional server-side devices (e.g., server farm) may also be communicatively coupled to the server-side device 450.

Figure 5:
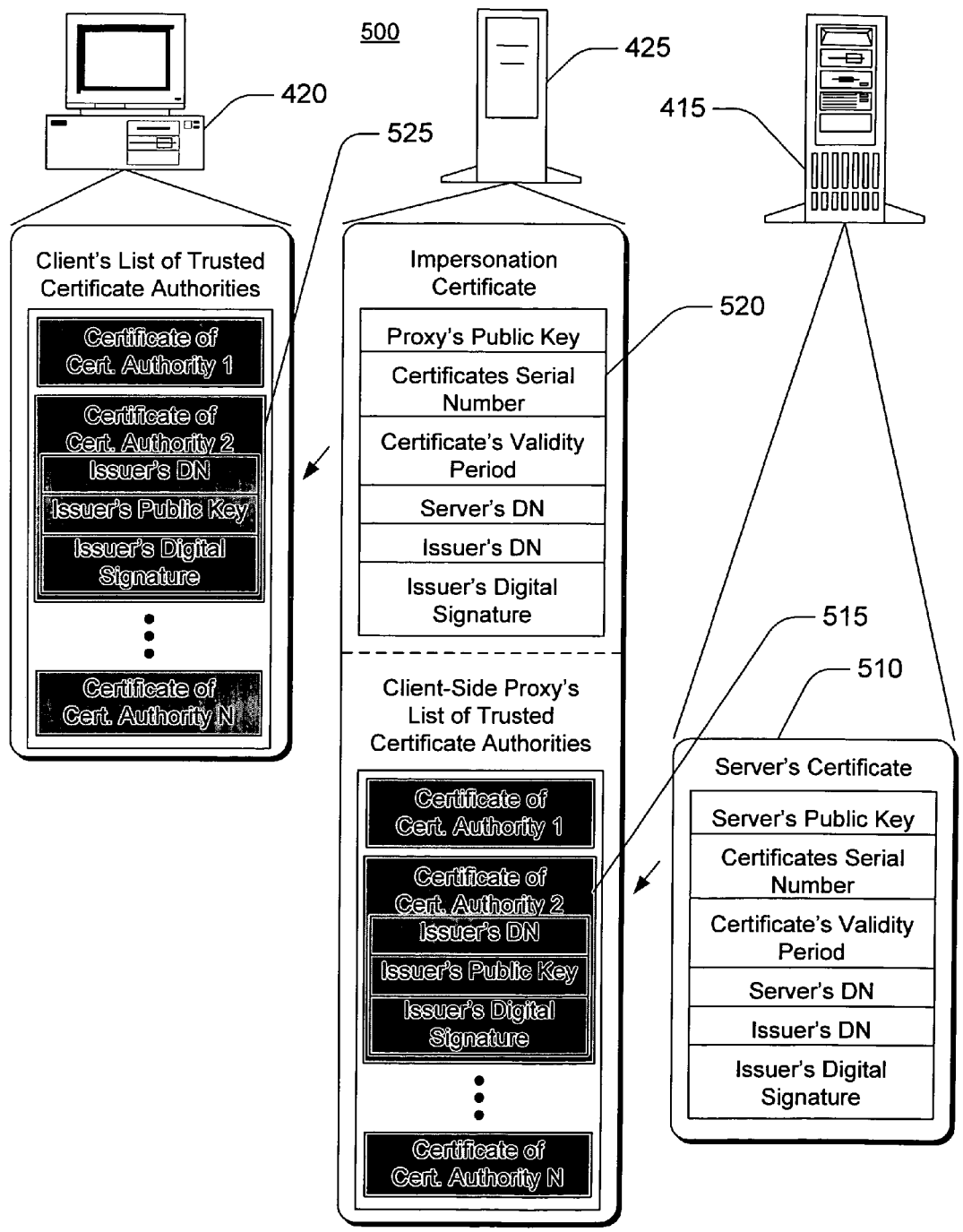
FIG. 5 shows a block diagram of a technique of establishing an inspected SSL session in a network.

The inspected SSL protocol includes a handshake phase for establishing a plurality of socket connections and a plurality of session phases for securely sending data between the client and server devices 420, 415. Referring now to FIG. 5, a technique of establishing an inspected SSL session in the network of FIG. 4 is shown. The handshake phase 500 includes negotiating a first SSL session 455 between the client device 420 and the client-side device 425, and a second SSL session 460 between the client-side device 425 and the server device 415. It is appreciated that the second SSL session 460 may include different SSL protocols from the client-side device 425 to the server-side device 450 and from the server side device 450 to the server 415.

More specifically, the handshake phase 500 includes exchanging a first set of commands between the client device 420 and the client-side device 425 to initiate a first session, to determine the version of SSL implemented by the devices, to determine the cipher libraries supported by the devices, to determine the data compression methods supported by the devices, to specify a session identifier of the first session, and to exchange random data for use in generating a first session key for the first session. A second set of commands are exchanged between the client-side device 425 and the server device 415 to initiate a second session, to determine the versions of SSL implemented by the devices, to determine the cipher libraries supported by the devices, to determine the data compression methods supported by the devices, to specify a session identifier of the second session, and to exchange random data for use in generating a second session key for the second session.

The handshake phase 500 further includes transmitting the certificate 510 of the server 415 to the client-side device 425. The client-side device 425 authenticates the identity that the certificate claims to represent. More specifically, the server's certificate 510 may include one or more of the following: a public key of the server, the certificate's serial number, the certificate's validity period, the server's domain name, an issuer's domain name, the issuer's digital signature and potentially other fields. The client-side device 425 authenticates the server device 415 by determining if the domain name of the issuer in the server's certificate 510 is contained in a list of trusted certificate authorities (CAs) 515 maintained by the client-side device 425. If the certificate authority is contained in the client-side device's list of trusted certificate authority 515, the corresponding issuer's public key contained in the client-side device's list of trusted certificate authorities 515 is used to validate the issuer's digital signature contained in the server's certificate 510 against the digital signature contained in the corresponding certificate authorities certificate 512. It is also determined if the current date is within the validity period specified in the server's certificate 510. In addition, it is determined whether the domain name in the server's certificate 510 matches the domain name of the server itself.

Using the data generated in the handshake so far, the client-side device 425 generates a first pre-master secret for the second SSL session. The client-side device 425 encrypts the first pre-master secret with the server's public key contained in the server's certificate 510 and transmits the encrypted pre-master secret to the server device 415. Only the corresponding private key of the server device 415 can correctly decrypt the first pre-master secret. According the client-side device 425 has some assurance that the identity associated with the public key is in fact the server 415 with which the client-side device 425 is connected.

The server device 415 uses its private key to decrypt the first pre-master secret. The client-side device 420 and the server device 415 each generate a first master secret from the first pre-master secret. Both the client-side device 420 and the server 415 use the first master secret to generate the second session key. The second session key is a symmetric key that is used to encrypt and decrypt data exchanged during the second SSL session.

If the second session is not established, the client-side device sends a command to the client device 420 to terminate the establishment of the first SSL session. If the second SSL session is established, the client-side device 425 sends an impersonation certificate 520 to the client device 420. The client-side device receives the impersonation certificate 520 from the certificate authority in an out-of-band transfer (e.g., in a transfer that is not part of establishing the SSL connection or a part of the SSL session). The impersonation certificate 520 contains the content of the servers' certificate 510 with the client-side device's public key substituted for the server's public key.

The client device 420 receives the impersonation certificate 520 and utilizes it to authenticate the identity that the certificate claims to represent. More specifically, the client device 420 authenticates the client-side device authenticating the server device 425 by determining if the domain name of the issuer is contained in a list of trusted certificate authorities (CAs) 525 maintained by the client device 420. If the certificate authority is contained in the client's list of trusted certificate authority 525, the corresponding issuer's public key contained in the client's list of trusted certificate authorities is used to validate the issuer's digital signature contained in the impersonation certificate 520. It is also determined if the current date is within the validity period.

The client device 420 generates a second pre-master secret utilizing the data generated during the portion of the handshake phase corresponding to the first session. The client device 420 encrypts the second pre-master secret with the client-side device's public key. Only the corresponding private key of the client-side device 425 can correctly decrypt the first pre-master secret.

The client-side device 425 uses its private key to decrypt the second pre-master secret. The client device 420 and the client-side device 425 each generate a second master secret from the second pre-master secret. Both the client device 420 and the client-side device 425 use the second master secret to generate a second session key. The second session key is a symmetric key that is used to encrypt, decrypt and validate the content of data exchanged during the first SSL session.

If the first and second SSL sessions are established, the client device 420 may provide an indicator to the user that an inspected SSL connection has been established. In response to the indicator, the user may proceed or may choose to terminate the inspected SSL session.

Figure 6:
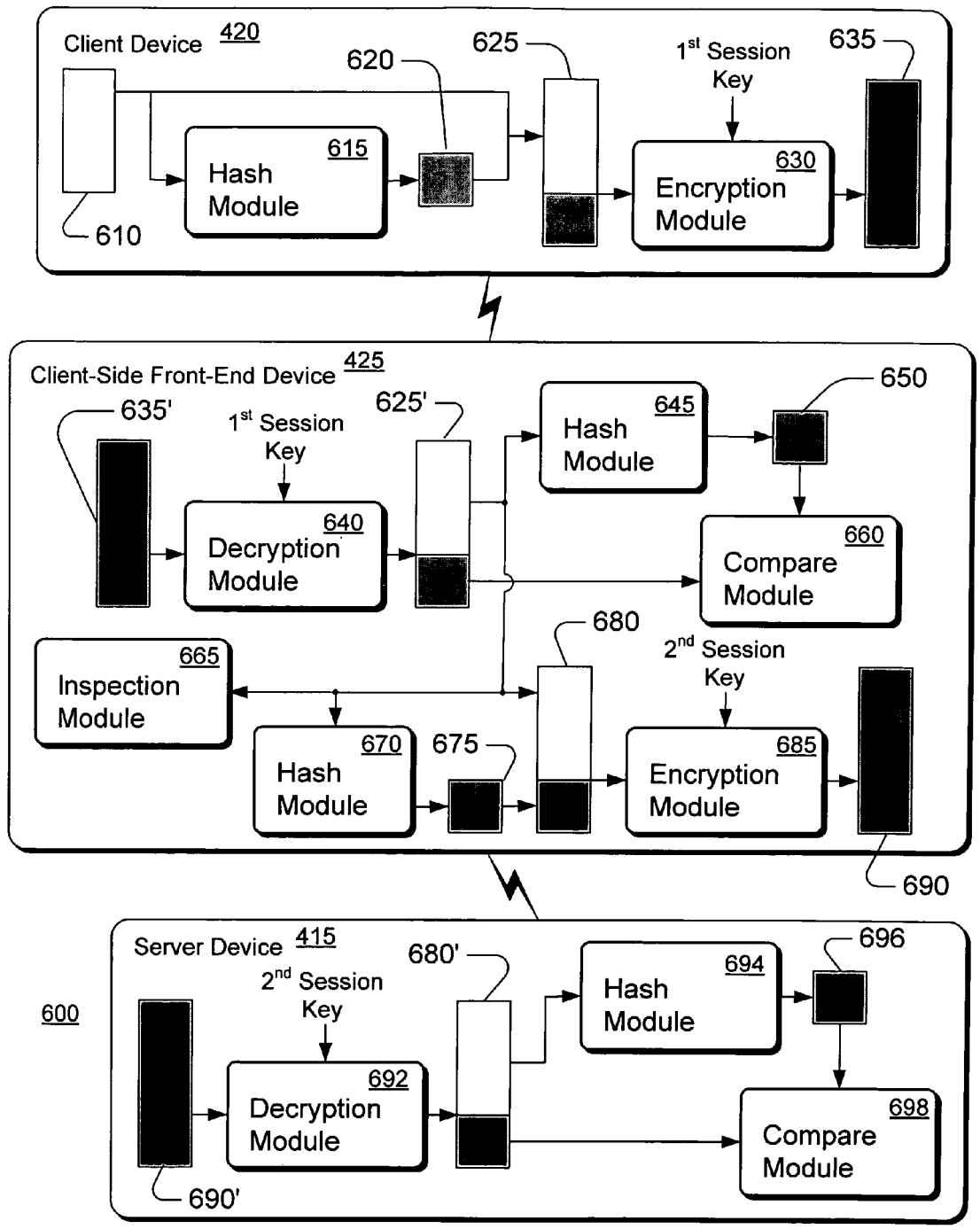
FIG. 6 shows a block diagram of a technique of exchanging data during an inspected secure socket layer session in a network.

Referring now to FIG. 6, a technique of exchanging data during an inspected SSL session in the network of FIG. 4 is shown. During the session phase 600, messages 610 generated by the client device 420 are hashed 615 to generate a message digest 620 (e.g., a cryptographic concise summary of the message). The hashing function may include a one-way cryptographic algorithm, such as MD5, SHA or the like. The message digest 620 is appended to the message 610 and the combination 625 is encrypted 630 utilizing the first session key. The resulting encrypted message 635 is then transmitted to the client-side device 425.

The client-side device 425 receives the encrypted message 635' and decrypts 640 it to recover the combined message 625'. The message portion of the combined message 625' is hashed 645 to generate an authenticator 650. The authenticator 650 is compared 660 to the message digest portion of the combined message 625'. If the authenticator 655 and the message digest portion of the combined message 325' are equivalent, the client-side device 425 know that the message has been received from the client device 420 and that it has not been altered during transmission.

The client-side device 425 may then inspect 665 the message in accordance with a security policy of the client-side network 410. For example, the client-side device 425 may inspect 665 the massage to determine if a client is sending confidential data to the server 415. The messages may then be hashed 670 by the client-side to generate a second message digest 675. The second message digest 675 is appended to the message 610' and the combination 680 is encrypted 685 utilizing the second session key. The resulting encrypted message 690 is then transmitted across one or more communication channels 440, 445 and one or more networks 430, 435 to the server device 415.

The server device 415 receives the encrypted message 690' and decrypts 692 it to recover the combined message 680'. The message portion of the combined message 680' is hashed 694 to generate a second authenticator 696. The second authenticator 696 is compared to the second message digest portion of the combined message 680'. If the authenticator 696 and the second message digest portion of the combined message 680' are equivalent, the server device 415 know that the message has been received from the client device 420 and that it has not been altered during transmission An equivalent process is also utilized to send messages from the server device 415 to the client device 420. The process enables the client-side device to decrypt the messages coming from the server 425, inspect the data and re-encrypting the data for transmission to the client device 420. The messages coming from the server may be inspected in accordance with a security policy of the client-side network 410. For example, the incoming messages may be inspected to determine if the client device 420 is receiving malicious content, such as worms, viruses and the like, from the server 415. The messages coming from the server device 415 may be inspected to prevent the downloading of forbidden content, such as racially offensive material, sexually offensive material and/or the like.

The first and second SSL sessions 460, 465 are transparent to the client and server device 420, 415. In particular, the client-side device 425 simulates the endpoint of the communication and does not immediately tunnel the request to its destination. Instead, the client-side device 425 negotiates a first SSL session 460 with the client 420 and negotiates a second SSL session 465 with the destination server 415. The transparent creation of the first and second SSL session 460, 465 enable the data to be inspected by the client-side device.

Figure 8:
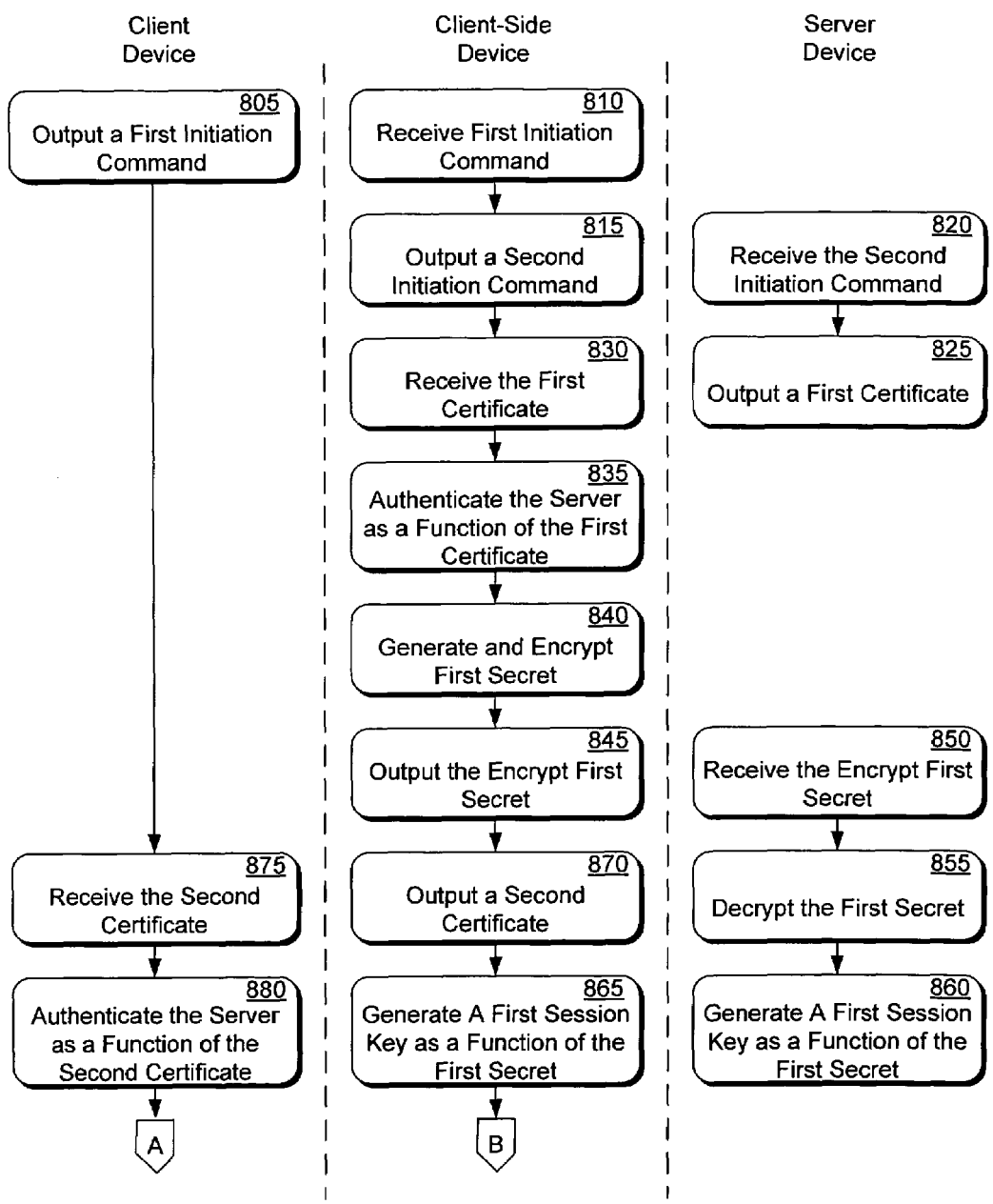
FIGS. 8, 9 and 10 show a flow diagram of a method for establishing an inspected secure connection.
Figure 9:
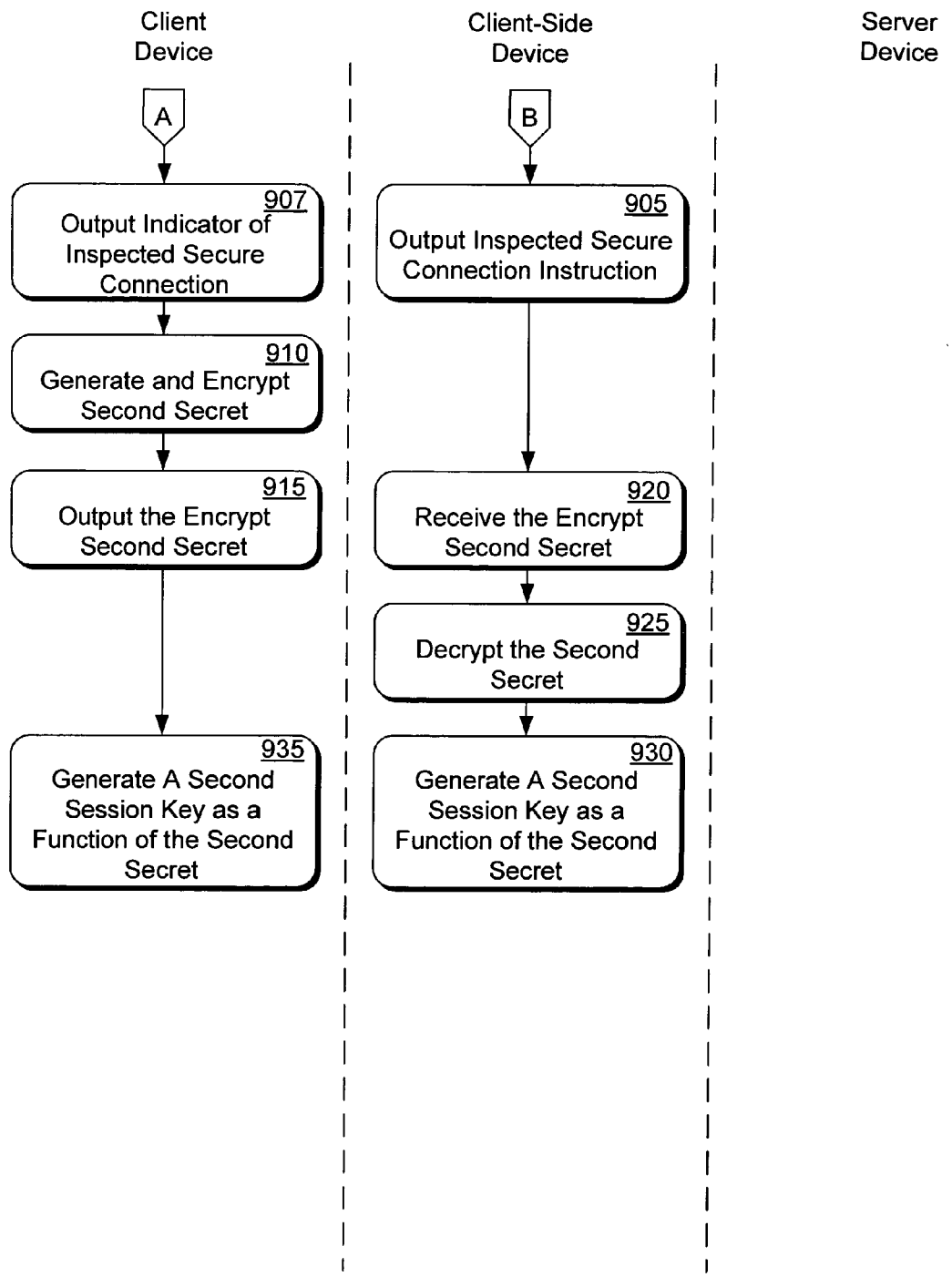
Figure 10:
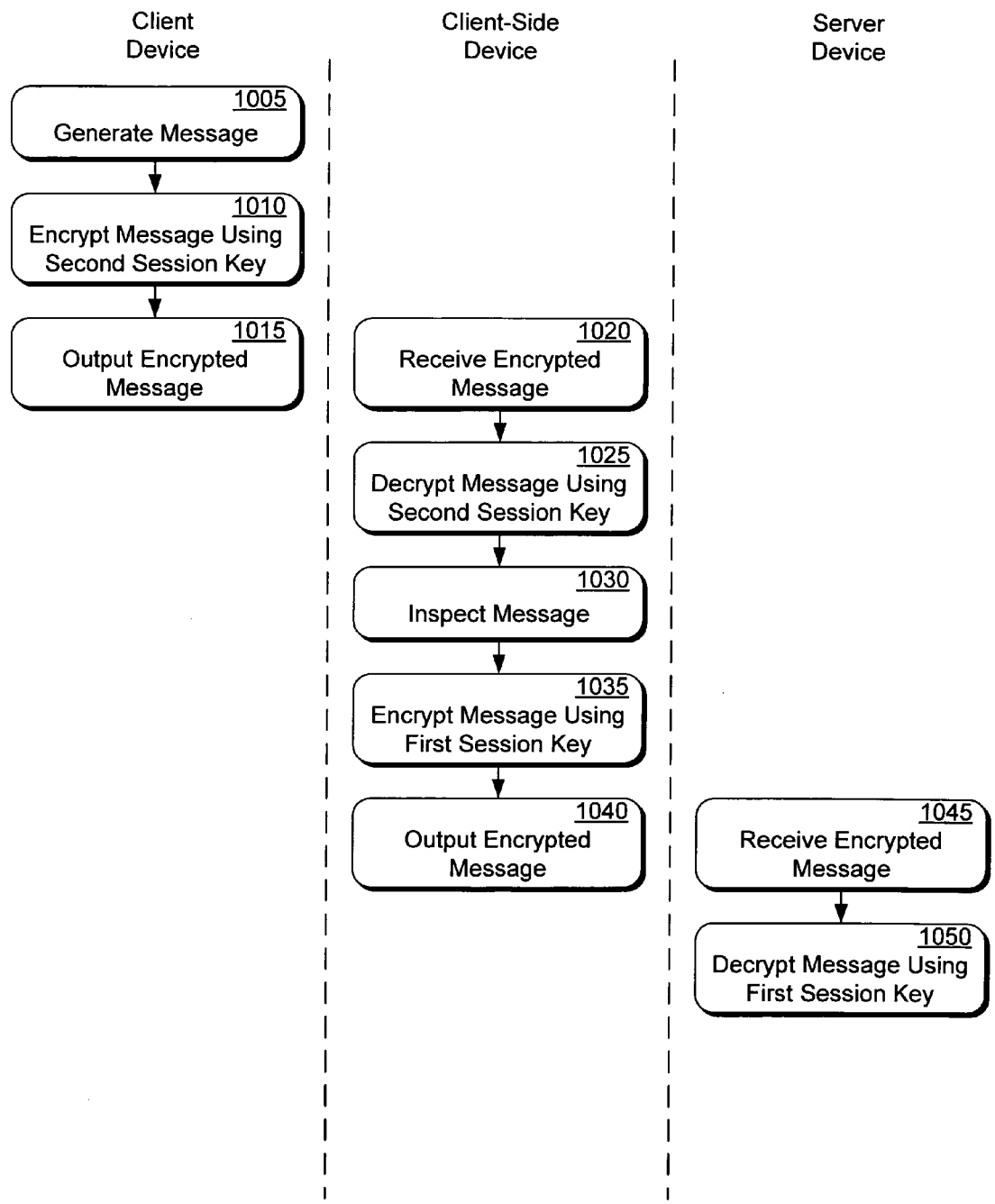

FIGS. 8, 9 and 10 show a method of establishing an inspected secure communication channel. The method includes outputting a first initiation command by the client device, at 805. The first initiation command is received by the client-side device, at 810. The client-side device, outputs a second initiation command in response to receipt of the first initiation command, at 815. The second initiation command is received by the server device at 820. At 825, the server device outputs a first certificate in response to the second initiation request. The client-side device receives the first certificate, at 830. At 835, the client-side device authenticates the server device as a function of the first certificate.

At 840, the client-side device generates a first secret and encrypts it utilizing the public key of the server device if the server device is authenticated by the client-side device. At 845, the client-side device outputs the encrypted first secret. At 850, the server device receives the encrypted first secret. At 855, the server device decrypts the first secret utilizing its private key. At 860, the server device generates a first session key as a function of the first secret. At 865, the client-side device also generates the first session key.

At 870, the client-side device outputs a second certificate if the server device is authenticated by the client-side device. At 875, the client device receives the second certificate. At 880, the client authenticates the server device as a function of the second certificate. The second certificate may be an impersonation certificate of the server that contains the public key of the client-side device. The impersonation certificate is received by the client-side device from a certificate authority in an out-of-band transfer.

Referring now to FIG. 9, the client-side device outputs an inspected secure communication instruction, at 905. The instruction provides notice to the client device that communications during the session may be inspected by the client-side device. The client outputs an inspected secure communication indicator, at 907, in response to the received inspected secure communication instruction. At 910, the client generates a second secret and encrypts it utilizing the public key of the client-side device, if the server device is authenticated by the client device. At 915, the client outputs the encrypted second secret. At 920, the client-side device receives the encrypted second secret. At 925, the client-side device decrypts the second secret. At 930, client-side device generates a second session key as a function of the second secret. At 935, the client device also generates the second session key as a function of the second secret.

Figure 11:
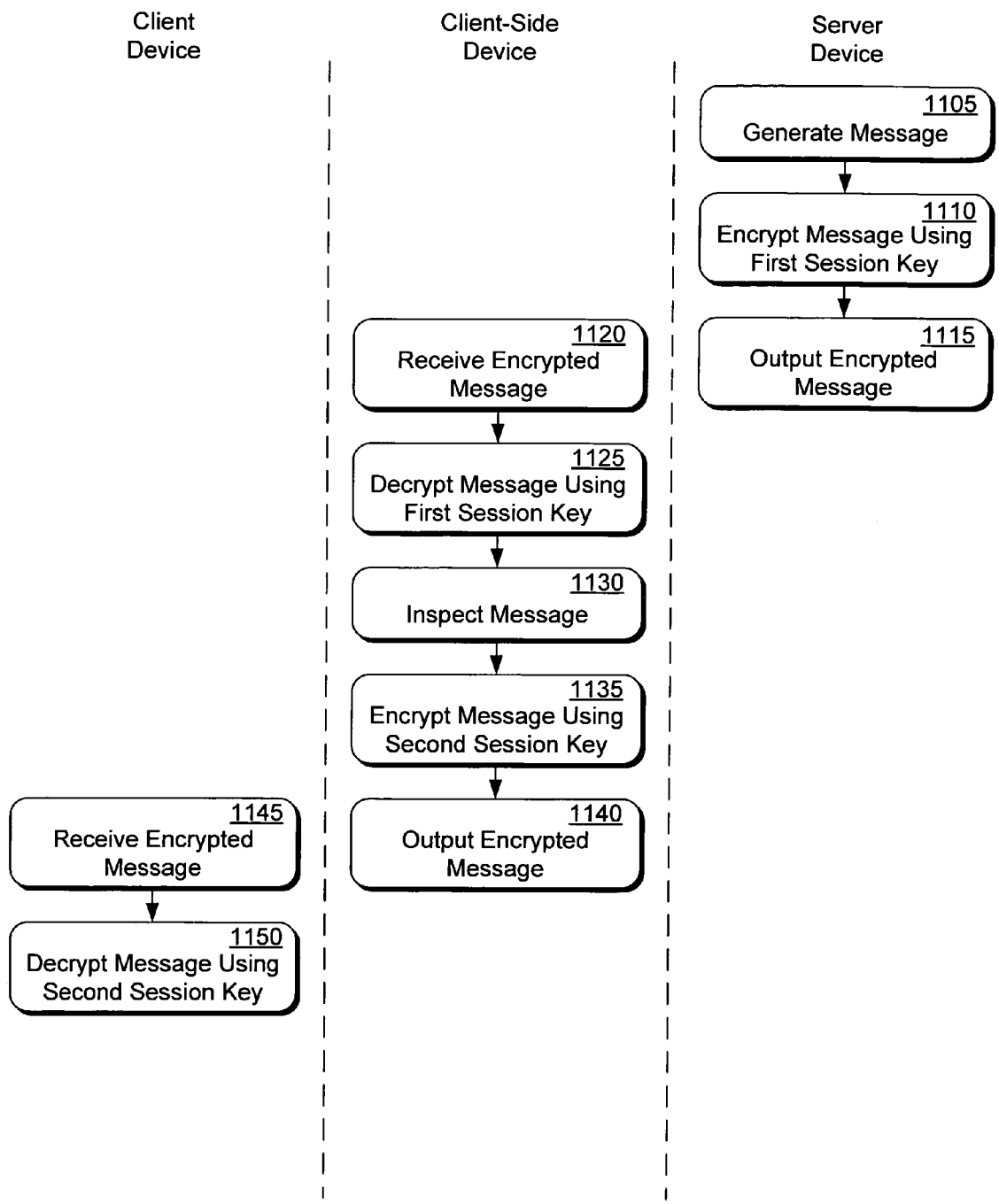

FIGS. 10 and 11 show a method for inspecting secure communications. The method begins with the client device generating a message, at 1005. At 1010, the client device encrypts the message utilizing the second session key. In one implementation, the message is encrypted utilizing a symmetric encryption algorithm. At 1015, the client device outputs the encrypted message.

At 1020, the client-side device receives the encrypted message. At 1025, the message is decrypted by the client-side device utilizing the second session key. At 1030, the message is inspected by the client-side device. In one implementation, a security policy is applied to the message by the client-side device. At 1035, the client-side device encrypts the massage utilizing the first session key. At 1040, the client-side device outputs the encrypted message.

At 1045, the server device receives the encrypted message. At 1050, the message is decrypted by the server device utilizing the first session key.

Referring now to FIG. 11, the server device may generate a message, at 1105. At 1110, the server device encrypts the message utilizing the first session key. In one implementation, the message is encrypted utilizing a symmetric encryption algorithm. At 1115, the server device outputs the first encrypted message.

At 1120, the client-side device receives the encrypted message. At 1125, the message is decrypted by the client-side device utilizing the first session key. At 1130, the message is inspected by the client-side device. In one implementation, a security policy is applied to the message by the client-side device. At 1135, the client-side device encrypts the massage utilizing the second session. At 1140, the client-side device outputs the encrypted message.

At 1145, the client device receives the encrypted message. At 1150, the message is decrypted by the client device utilizing the second session key.

Accordingly, the client-side device establishes a first secure connection with the client and establishes a second connection with the destination server. The creation of the first and second secure connections enables the messages to be inspected by the client-side device.

Generally, any of the processes for inspecting secure communications described above can be implemented using software, firmware, hardware, or any combination of these implementations. The term "logic, "module" or "functionality" as used herein generally represents software, firmware, hardware, or any combination thereof. For instance, in the case of a software implementation, the term "logic," "module," or "functionality" represents computer-executable program code that performs specified tasks when executed on a computing device or devices. The program code can be stored in one or more computer-readable media (e.g., computer memory). It is also appreciated that the illustrated separation of logic, modules and functionality into distinct units may reflect an actual physical grouping and allocation of such software, firmware and/or hardware, or can correspond to a conceptual allocation of different tasks performed by a single software program, firmware routine or hardware unit. The illustrated logic, modules and functionality can be located at a single site, or can be distributed over a plurality of locations. It should also be appreciated that terms such as "first" and "second" are used to identify a given element, step, process or the like and is not intended to imply a particular order unless the context clearly indicates such.

Although the techniques for inspected secure communications have been described in language specific to structural features and/or methods, it is to be understood that the subject of the appended claims is not necessarily limited to the specific features or methods described. Rather, the specific features and methods are disclosed as exemplary implementations of techniques for inspected secure communications.

What is claimed is:

1. An inspected secure socket layer protocol comprising:
    establishing a first secure socket layer session between a client device and a client side device, wherein establishing the first secure socket layer session comprises:
        receiving an impersonation certificate; and
        authenticating the server device based on the impersonation certificate, wherein the impersonation certificate comprises a server's certificate that contains a public key of the client-side device that has been substituted for a public key of the server certificate;
    establishing a second secure socket layer session between the client-side device and a server device; and
    inspecting traffic between the first secure socket layer session and the second socket layer session, wherein the traffic comprises a message digest and a message and the inspection comprises inspecting the message portion of the traffic.

2. An inspected secure socket layer protocol according to claim 1, wherein establishing the second secure socket layer session comprises:
    receiving a server device certificate; and
    authenticating the server device based on the server-side certificate.

3. An inspected secure socket layer protocol according to claim 1, further comprising providing an indicator to a user that an inspected secure socket layer session has been established.

4. A system comprising:
    a client device;
    a server device; and
    a client-side device communicatively coupled between the client device and the server device, wherein the client-side device is adapted to:
        receive a first certificate, wherein the first certificate contains a public key;
        authenticate the server device as a function of the first certificate;
        generate a first session key if the server device is authenticated;
        output a second certificate if the server device is authenticated, wherein the second certificate is an impersonation certificate, the impersonation certificate comprises the first certificate, wherein the first certificate's public key is substituted for a public key of the client-side device;
        receive a first secret encrypted using a public key of the client-side device; and
        generate a second session key as a function of the first secret.

5. The system of claim 4, wherein the client-side device is further adapted to:
    receive a first encrypted message;
    generate a first message by decrypting the first encrypted message using the second session key;
    apply a security policy to the first message;
    generate a second encrypted message by encrypting the message using the first session key; and
    outputting the second encrypted message.

6. The system of claim 4, wherein the client-side device is further adapted to:
    receive a first encrypted message;
    generate a first message by decrypting the first encrypted message using the second session key;
    apply a security policy to the first message;
    generate a second encrypted message by encrypting the message using the first session key; and
    output the second encrypted message.

7. The system of claim 4, wherein the client device is adapted to:
    receive the second certificate;
    authenticate the server device as a function of the second certificate;
    generate the second session key if the client-side device is authenticated; and
    generate an inspected secure communication indicator as a function of the second certificate.

8. The system of claim 4, wherein the server device is adapted to:
    output the first certificate;
    receive a second secret encrypted using a public key of the server device; and
    generate the first session key as a function of the second secret.

* * * * *